(12) United States Patent
Tiliks et al.

(10) Patent No.: US 7,095,832 B2  
(45) Date of Patent: *Aug. 22, 2006

(54) METHOD OF BILLING IN AN ABBREVIATED DIALING SERVICE

(75) Inventors: Dianna Inara Tiliks, Elk Grove, IL (US); Carol Shifrin Gruchala, Naperville, IL (US); Susanne Marie Crockett, Buffalo Grove, IL (US); Nancy Ann Book, Naperville, IL (US); John Wesley Moss, Lake Zurich, IL (US); Thomas Joseph McBlain, Arlington Heights, IL (US); Gordon Lynn Blumenschein, Woodridge, IL (US); William M. Moy, Wheeling, IL (US); Kenneth Robert Stroud, Lago Vista, TX (US)

(73) Assignees: Ameritech Corporation, Hoffman Estates, IL (US); SBC Services, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/935,243

(22) Filed: Sep. 8, 2004

(65) Prior Publication Data

US 2005/0078813 A1    Apr. 14, 2005

Related U.S. Application Data

(63) Continuation of application No. 09/994,889, filed on Nov. 28, 2001, now Pat. No. 6,850,605.

(51) Int. Cl.  
*H04M 15/00* (2006.01)  
*H04M 3/42* (2006.01)  
*H04M 11/00* (2006.01)

(52) U.S. Cl. ............... 379/114.05; 379/114.21; 379/114.23; 379/114.24; 379/216.01; 455/406

(58) Field of Classification Search .......... 379/112.01, 379/114.01, 114.03, 114.05, 114.1, 114.12, 379/114.21, 114.24, 114.23, 114.25, 114.28, 379/115.01, 157, 201.01, 216.01, 221.08, 379/221.09, 222, 355.01, 355.05; 455/405, 455/406, 408, 414.1  
See application file for complete search history.

(56) References Cited

U.S. PATENT DOCUMENTS

| | | | |
|---|---|---|---|
| 3,691,301 A | 9/1972 | Zarouni |
| 3,975,595 A | 8/1976 | Berube et al. |
| 4,600,812 A | 7/1986 | Gerlits |
| 5,150,399 A | 9/1992 | Yasuda |
| 5,182,766 A | 1/1993 | Garland |
| 5,216,703 A | 6/1993 | Roy |
| 5,272,748 A | 12/1993 | Davis |
| 5,524,146 A | 6/1996 | Morrisey et al. |
| 5,533,107 A | 7/1996 | Irwin et al. |
| 5,539,817 A | 7/1996 | Wilkes |
| 5,566,229 A | 10/1996 | Hou et al. |
| 5,566,235 A | 10/1996 | Hetz |

(Continued)

FOREIGN PATENT DOCUMENTS

JP    9-252347    9/1997

(Continued)

*Primary Examiner*—Quoc Tran  
(74) *Attorney, Agent, or Firm*—Greenblum & Bernstein, P.L.C.

(57) ABSTRACT

A telecommunications service translates an abbreviated dialing code into a toll free number, routes the call to an interexchange carrier, and manages the billing associated with the call. A billing system processes the billing such that a subscriber of the abbreviated dialing code service is billed for the call rather than a calling party.

21 Claims, 6 Drawing Sheets

| #XXX | LATA | State Name | Routing Number | AMA slpID | Alternate Billing Number |
|---|---|---|---|---|---|
| 333 | 358 | ILLINOIS | 800-299-1234 | 033300101 | 312-999-0123 |
| 333 | 229 | WISCONSIN | 800-706-7060 | 033300101 | 312-999-1234 |
| 333 | 432 | INDIANA | 888-987-9876 | 033300101 | 312-999-5678 |
| 444 | 589 | MICHIGAN | 800-369-3699 | 044400110 | 312-999-9012 |

U.S. PATENT DOCUMENTS

| | | |
|---|---|---|
| 5,574,780 A | 11/1996 | Andruska et al. |
| 5,673,312 A | 9/1997 | Andruska et al. |
| 5,752,186 A | 5/1998 | Malackowski et al. |
| 5,812,654 A | 9/1998 | Anderson et al. |
| 5,835,583 A | 11/1998 | Hetz et al. |
| 5,850,599 A | 12/1998 | Seiderman |
| 5,859,901 A | 1/1999 | Brendzel et al. |
| 5,867,780 A | 2/1999 | Malackowski et al. |
| 5,974,133 A | 10/1999 | Fleischer, III et al. |
| 6,246,757 B1 | 6/2001 | Cai et al. |
| 6,324,273 B1 | 11/2001 | Alcott |
| 6,411,803 B1 | 6/2002 | Malackowski et al. |
| 6,522,876 B1 | 2/2003 | Weiland et al. |
| 6,850,605 B1 * | 2/2005 | Tiliks et al. ........... 379/114.05 |
| 2002/0136374 A1 | 9/2002 | Fleischer, III et al. |

FOREIGN PATENT DOCUMENTS

| | | |
|---|---|---|
| WO | 00/14992 | 3/2000 |

* cited by examiner

| #XXX | LATA | State Name | Routing Number | AMA slpID | Alternate Billing Number |
|---|---|---|---|---|---|
| 333 | 358 | ILLINOIS | 800-299-1234 | 033300101 | 312-999-0123 |
| 333 | 229 | WISCONSIN | 800-706-7060 | 033300101 | 312-999-1234 |
| 333 | 432 | INDIANA | 888-987-9876 | 033300101 | 312-999-5678 |
| 444 | 589 | MICHIGAN | 800-369-3699 | 044400110 | 312-999-9012 |

FIG. 5

METHOD OF BILLING IN AN ABBREVIATED DIALING SERVICE

CROSS-REFERENCE TO RELATED APPLICATION

This application is a continuation of U.S. patent application Ser. No. 09/994,889, filed on Nov. 28, 2001, now U.S. Pat. No. 6,850,605, the content of which is incorporated by reference herein in its entirety.

BACKGROUND OF THE INVENTION

1. Field of the Invention

The present invention relates to the field of telecommunications. More particularly, the present invention relates to translating an abbreviated dialing code into a ten digit number and managing the billing associated with the call.

2. Acronyms

The written description provided herein contains acronyms that refer to various telecommunications services, components and techniques, as well as features relating to the present invention. Although some of these acronyms are known, use of these acronyms is not strictly standardized in the art. For purposes of the written description herein, acronyms will be defined as follows:

Access Code (AC)
Advanced Intelligent Network (AIN)
Automatic Message Accounting (AMA)
Bellcore Automatic Message Accounting Format (BAF)
Carrier Access Billing System (CABS)
Carrier Identification Code (CIC)
Central Office (CO)
Customer Record and Information System (CRIS)
File Transport Protocol (FTP)
Free Billing Table (FBT)
Local Access and Transport Area (LATA)
Integrated Services Digital Network User Part (ISUP)
Interexchange Carrier (IXC)
Integrated Service Control Point (ISCP)
Off-Hook Delay (OHD)
Plain Old Telephone Service (POTS)
Public Office Dialing Plan (PODP)
Public Switched Telephone Network (PSTN)
Service Control Point (SCP)
Service Logic Program Identifier (slpID)
Service Management System (SMS)
Service Switching Point (SSP)
Signal Transfer Point (STP)
Signaling System 7 (SS7)
Transaction Capabilities Applications Protocol (TCAP)
Vertical Service Code (VSC)
Wide Area Network (WAN)

3. Description of Background Information

National advertisers and companies are continually seeking methods to sell their products to consumers. Putting the consumer in contact with the seller is critical to the relationship between companies and consumers. Previously, companies enticed consumers to call them using 800 or 888 toll free telephone numbers, in which the caller was not charged for the telephone call. However, consumers are not likely to remember the complete 800 or 888 numbers for every company they may wish to contact. As a result, it would be desirable to have an abbreviated dialing code that would allow callers to reach national advertisers.

Consumers would be more likely to place calls to an abbreviated dialing code service if they would incur no costs associated with the calls. Such a service would bring advertisers and consumers together to each other's benefit.

However, a significant problem associated with this type of service includes billing calls originating from various states and LATAs. A solution must be offered to see that charges are incurred by the subscriber offering the abbreviated dialing code service based on the number of calls to the service regardless of the billing system used in the state. It would also be advantageous to allow subscribers to provision call routing and billing information via the Internet.

The present invention overcomes the problems associated with the prior art.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 5 is an exemplary #XXX table, according to an aspect of the present invention.

DETAILED DESCRIPTION OF THE EMBODIMENTS

Figure 1:
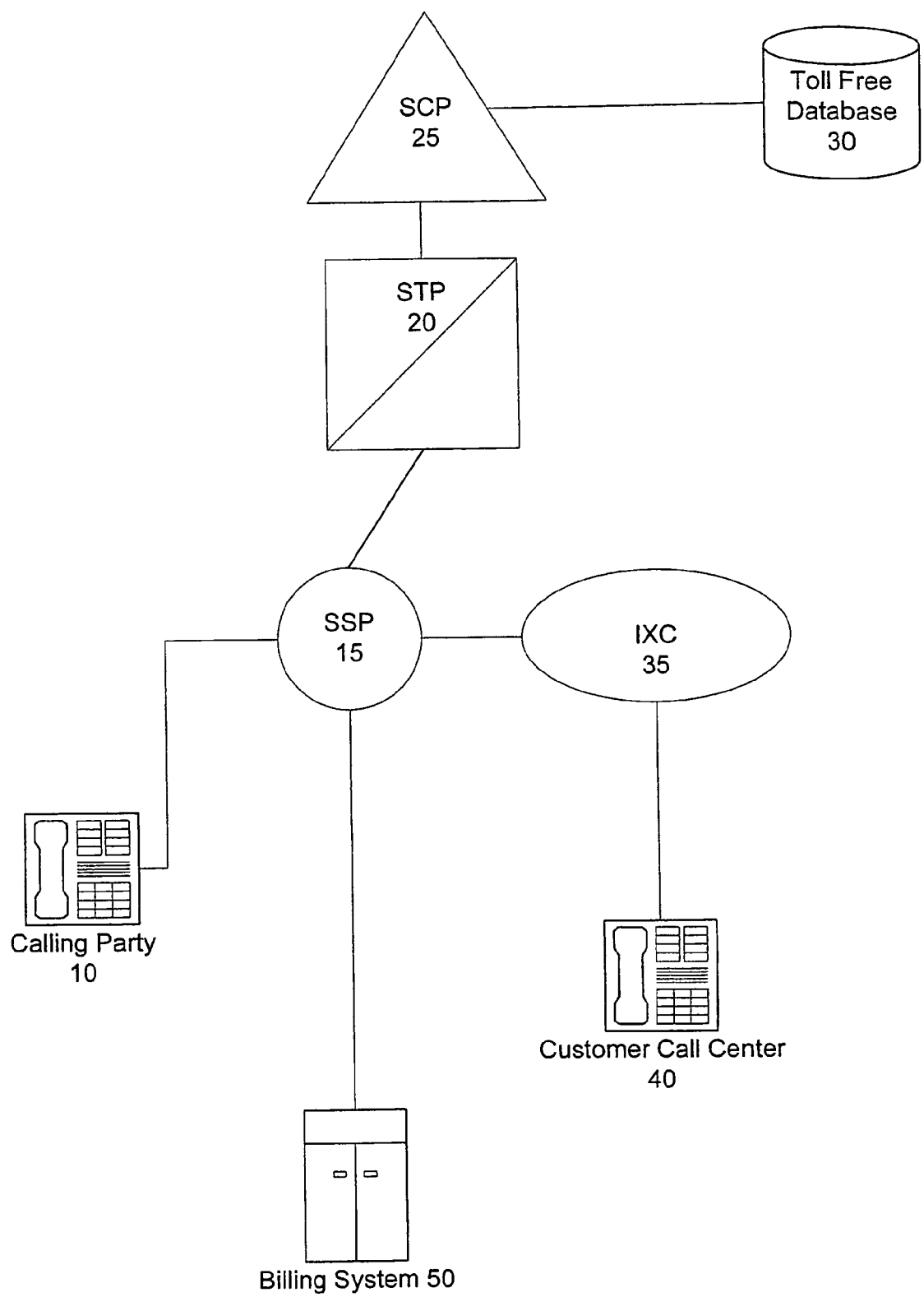
FIG. 1 is an exemplary functional block diagram of a telecommunications network, according to an aspect of the present invention.

In view of the foregoing, the present invention, through one or more of its various aspects and/or embodiments is thus presented to provide an abbreviated dialing service that operates within an AIN environment.

Accordingly, one aspect of the invention is to provide a method of billing a subscriber for abbreviated dialing code calls placed by a calling party in an AIN telecommunications environment. The method includes receiving an incoming call at a terminating switch and launching a query in response to a request from the calling party to establish a connection with the subscriber, the calling party having dialed the abbreviated dialing code. The method further includes accessing a service control point in response to the query and determining at the service control point an alternate billing number based upon the location of the calling party and the abbreviated dialing code. The method further includes determining an automatic message accounting (AMA) number at the service control point and using the alternate billing number instead of an abbreviated dialing code AMA record associated with the AMA number so that the subscriber is billed for the call rather than the calling party.

The method may include appending a first module to the alternate billing number and appending a second module to the AMA number at the service control point, sending the alternate billing number with the first module and the AMA number with the second module to the switch, and then sending the alternate billing number with the first module and the AMA number with the second module to a billing system.

The method may also include directing the billing system to bill the subscriber for the call based on instructions defined by the first module. Further, the method may include discarding the abbreviated dialing code AMA record based on instructions defined by the second module. The discarding may further include cross checking the AMA number in a billing table. The billing system may determine whether the alternate billing number and AMA number received from the switch match data in the billing system, indicating that alternate billing number and AMA number were received at the correct billing system.

Another aspect of the present invention is to provide a method of billing a subscriber for abbreviated dialing code calls placed by a calling party in an AIN telecommunications environment. The method includes receiving an incoming call at a terminating switch and launching a query in response to a request from the calling party to establish a connection with the subscriber, the called party having dialed the abbreviated dialing code. The method further includes accessing a service control point in response to the query and translating the abbreviated dialing code into a toll free number. The method also includes determining at the service control point an alternate billing number based upon the location of the calling party and the abbreviated dialing code, and also determining at the service control point an automatic message accounting (AMA) number.

Further, the method includes appending a first module to the alternate billing number, appending a second module to the AMA number, sending the alternate billing number with the first appended module to the billing system, and the AMA number with the second appended module to the billing system and then using the alternate billing number instead of an abbreviated dialing code AMA record associated with the AMA number so that the subscriber is billed for the call rather than the calling party.

The method may include instructing the billing system to bill the abbreviated dialing code service provider for the call based on the alternate billing number with the appended first module. Further, the method may include directing the billing system to discard the abbreviated dialing code AMA record based on the AMA number with the appended second module. The discarding may include cross checking the AMA number in a billing table. The abbreviated dialing code may include a #XXX or #XX sequence.

Another aspect of the present invention is to provide a telecommunications system for processing calls placed by a calling party to an abbreviated dialing code service in an AIN telecommunications environment. The system includes a service control point that derives an alternate billing number with a first appended module and derives an automatic message accounting (AMA) number with a second appended module. The system further includes a service switching point that receives the alternate billing number with a first appended module and AMA number with a second appended module from the service control point. Further, the system includes a billing system that receives from the service switching point the alternate billing number and the AMA number, in which the billing system uses the alternate billing number to bill a provider of the abbreviated dialing code service provider instead of billing the calling party.

The billing system may include a component that interprets the first module as an instruction to billing the subscriber. The billing system may include a component that interprets the second module as an instruction to discard an abbreviated dialing code AMA record. Further, the billing system may include a component that cross checks the AMA number in a billing table prior to discarding the abbreviated dialing code AMA record. The billing system may also include a component that determines whether the alternate billing number and AMA number received from the switch match data in the billing system.

Another aspect of the present invention is to provide a method for provisioning an abbreviated dialing code service from a graphical user interface. The method includes presenting to the subscriber at the graphical user interface a subscriber data directory, in which the subscriber data directory contains at least one abbreviated dialing code and an associated state and local access and transport area (LATA). The method further includes receiving from the subscriber a toll free number associated with the at least one abbreviated dialing code and storing the abbreviated dialing code, toll free number, state, and LATA in an AIN database. The subscriber may add, change, or delete a toll free number associated with the abbreviated dialing code.

Another aspect of the present invention is to provide a computer readable medium for storing a computer program that processes billing for a telephone call placed to an abbreviated dialing code. A recording source code segment is included that receives data from a switch associated with a telephone call placed to the abbreviated dialing code, in which the data comprises at least an alternate billing number with a first appended module and an automatic message accounting (AMA) number with a second appended module. A billing source code segment is included that uses the alternate billing number instead of an abbreviated dialing code AMA record associated with the AMA number so that the calling party if not billed for the call and the subscriber is billed for the call. A cross checking source code segment may be included that cross checks the AMA number with a billing table to determine whether to discard an abbreviated dialing code AMA record.

The present invention is an AIN based system and method for translating an abbreviated dialing code into a ten digit toll free number, routing the call to an Interexchange Carrier (IXC), and managing the billing associated with the call. The IXC will in turn route the call to a customer call center or retailer. Once the call reaches the customer call center, a representative will ask the caller what product, company or advertiser they desire, and then the customer call center will route the call to the respective company or advertiser via the company/advertiser's toll free number. An important feature of the present invention is that the caller does not incur any charges associated with the call. Charges associated with the call are billed to the subscriber.

As used herein, the term caller refers to the person originating a telephone call. The term subscriber is defined as the service provider of the abbreviated dialing code and operator of the customer call center. The subscriber will offer their service to mostly, but not exclusively, large national advertisers or companies who generally employ radio and outdoor advertising methods to reach their particular market. Also, the term access code may be used herein interchangeably with abbreviated dialing code. Further, toll free numbers as discussed herein includes 800 and 888 numbers, as well as any future toll free number assignments.

FIG. 1 illustrates an exemplary telecommunications network of the present invention. The network 1 includes a calling party 10, a Service Switching Point (SSP) 15, a Signal Transfer Point (STP) 20, a Service Control Point (SCP) 25, a toll free database 30, an IXC 35, a customer call center 40, and a billing system 50.

The SSP 15 is the originating central office (CO) for the caller. The SSP 15 triggers when it receives an abbreviated dialing code and then sends a query to the SCP 25. The SSP 15 may comprise, for example, 1AESS or 5ESS switches manufactured by Lucent Technologies, or DMS-100 switches manufactured by Nortel Networks Corporation (Nortel), or AXE-10 switches manufactured by Telefonaktiebolaget LM Ericsson. The 1AESS switches may use an AIN Release 0.1 protocol and should be equipped with Generic 1AE13.01 (or higher) software and associated AIN SSP features. The 5ESS switches may utilize an AIN Release 0.1 protocol and should be equipped with Generic 5E12 (or higher) software and associated AIN SSP features. The DMS-100 switches (release NA009) may utilize an AIN Release 0.1 protocol and associated AIN SSP features. The AXE-10 switches may utilize an AIN Release 0.1 protocol and should be equipped with Generic 8.07 (or higher) software and associated AIN SSP features.

The call service logic of the present invention may be upgraded to accommodate future AIN releases and protocols and future trigger types. Specifications of AIN Release 0.1 SSPs may be found in Bellcore TR-NWT-001285, Switch-Service Control Point (SCP) Application Protocol Interface Generic Requirements, the disclosure of which is expressly incorporated by reference herein in its entirety, as well as Advanced Intelligent Network (AIN) 0.1 Switching Systems Generic Requirements (GR-1298-CORE, Issue 5, November 1999) and the Advanced Intelligent Network (AIN) Generic Requirements: Switch-Service Control Point (SCP)/Adjunct Interface (GR-1299-CORE, Issue 4, September 1997), the disclosures of which are also expressly incorporated by reference herein in their entireties.

While SCPs are primarily discussed and referred to and shown in one or more of the accompanying drawings, it is noted that an Integrated Service Control Point (ISCP) may be employed as well, and that the terms are used interchangeably herein. It is further noted that SCPs/ISCPs may be deployed in mated pairs to ensure survivability and reliability of the network.

Exemplary service control points include the Telecordia Integrated Service Control Point Current Generation Platform (ISCP) (CGP) with Release version 5.0.9.13; the ISCP Next Generation Platform (NGP) with Release version 6.4.2.1; and the Lucent Service Control Point (LSCP) with Release 94 and Service Package Application Version 6 (SPA V6) or later. The interface between the service switching points and the service control point may be the Telecordia AIN GR-1299, entitled "Switch-Service Control Point (SCP)/Adjunct Interface."

The messages transmitted between the SSP 15 and SCP 25 are all formatted in accordance with the Signaling System 7 (SS7) transaction capabilities applications protocol (TCAP). Integrated Services Digital Network User Part (ISUP) signaling is utilized between the central offices.

The SCP 25 stores information provisioned by the subscriber including 800 routing number information for each of the subscriber's designated abbreviated dialing codes. The SCP service logic derives the subscriber's 800 routing number designated for the LATA in which the call originates. The 800 routing numbers are entered into a database by the subscriber as will be discussed later. Also, the SCP 25 stores information associated with the calling party such as the calling party ID (calling party number), LATA, and the name of the state in which the caller resides. More specifically, an NPANXX table is maintained which determines the LATA and state of the caller based upon the NPANXX of the originating call. It is necessary to determine the state name for proper routing to the correct customer call center since some LATAs encompass more than one state.

For billing charges to the subscriber, the SCP service logic derives and returns an alternate billing number associated with the subscriber's abbreviated dialing code for the state and LATA in which the call originated. The alternate billing number is used to bill charges associated with the call to the subscriber's account. The SCP service logic also derives and returns an Automatic Messaging Accounting (AMA) number (i.e., AMA slpID) that is designated for each abbreviated dialing code. The AMA slpID is used so that the caller is not billed for calling the abbreviated dialing code. A module (i.e., index) associated with and appended to the alternate billing number and AMA slpID directs the billing system 50 to utilize these parameters in processing the billing. Both the alternate billing number and AMA slpID are obtained at the SCP 25 via a database lookup in an #XXX table, as will be discussed later.

Additional functionality associated with the SCP 25 includes requesting information from other network elements. In this regard, the SCP 25 receives and processes SSP query messages, generates and sends messages in response to the SSP queries, and generates counts of abbreviated dialing code call information.

The toll free database 30, upon request by the SSP 15, returns an appropriate IXC carrier identification code (CIC) assigned to the 10 digit toll free number previously determined by the SCP 25. The query also returns the standard toll free billing (i.e., AMA) parameters. The IXC CIC code and appended 10 digit toll free number are used to pass the call to the IXC 35.

The IXC 35 takes the call handed to it by SSP 15 and routes it to the customer call center 40. A representative at the customer call center 40 prompts the caller for the company or advertiser desired by the caller. Based upon the caller's response, the call is routed using the company's/advertiser's toll free number.

The billing system 50 is a computer data processing system that inputs appropriate charges on the subscriber's account and also discards billing records associated with end users of the abbreviated dialing code service. The billing system 50 receives AMA records and other data from the SSP 15 that help facilitate the billing process, as will be explained herein.

The abbreviated dialing code consists of, e.g., a #XXX or #XX dialing sequence as entered by the caller, rather than the conventional 7 or 10 digit number sequence. Due to limitations associated with 1AESS switches, 2 digit codes (e.g., #XX) are used in areas where 1AESS switches are implemented. Unless otherwise indicated, #XXX and #XX will be used interchangeably herein. The #XXX service is implemented using the following number assignments #000, #111, #227, #265, #289, #328, #333, #349, #359, #363, #444, and #849. However, it is possible that other number assignments may be employed. Regarding 1AESS switches, the two digit codes are translated into the appropriate three digit codes at the SCP 25. The #XX service may be implemented using number assignments including 00, 11, 22, 26, 28, 32, 33, 34, 35, 36, and 84. However, it is possible that other number assignments may be employed. A standard announcement will be provided by the SSP 15 in the event that the dialed number is invalid or otherwise out of service.

The #XXX service employs a Public Office Dialing Plan (PODP) feature code trigger that will be provisioned on all caller lines permitted to access the #XXX service in all AIN equipped digital offices. That is, the trigger must be set for all lines in a switch for the service to function. The PODP feature code trigger, and #XXX service, are compatible with vertical service code logic. Additional triggers compatible with this service include an Off-Hook Delay (OHD) trigger and a Vertical Service Code (VSC) trigger. Vertical service code logic, accessed utilizing one of the aforementioned triggers at the SSP 15, performs the call processing for the #XXX service. Further information regarding this is detailed in Bellcore GR1298-CORE, noted above.

Figure 2:
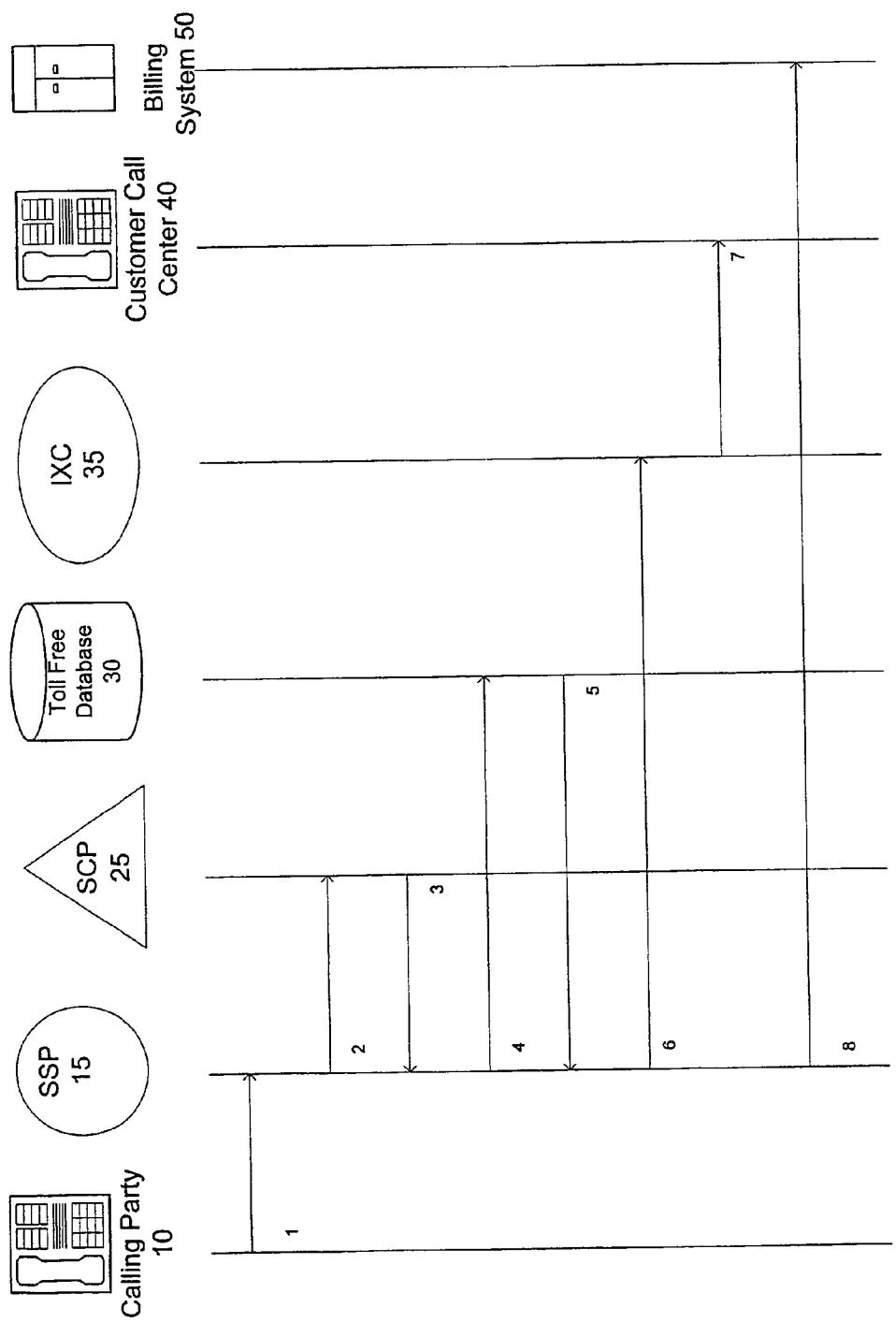
FIG. 2 is an exemplary call flow diagram according to an aspect of the present invention.

FIG. 2 illustrates an exemplary call flow diagram of the present invention. At step 1, a caller dials an abbreviated dialing code (e.g., #XXX) to reach a company or national advertiser. At step 2, a trigger on the caller's line sends a query from the end office SSP 15 through the STP 20 (not shown in FIG. 2) to the SCP 25, which queries an internal AIN database. The SCP service logic will be discussed in more detail with respect to FIG. 4. The AIN database at the SCP 25 recognizes the #XXX number and translates it to the appropriate ten digit toll free number based upon the calling party ID, state, and LATA of the caller. These parameters are obtained using the NPANXX of the caller and performing a lookup in an NPANXX table. Also at step 3, the SCP 25 returns an alternate billing number and AMA slpID to the SSP 15 based upon the subscriber's abbreviated dialing code and the state and LATA in which the call originated. These parameters are obtained via a lookup in a #XXX table.

From the AIN database of the SCP 25, the ten digit toll free number is sent back through the STP 20 (not shown in FIG. 2) to the SSP 15 at step 3. In response to the information received from the SCP 25, an abbreviated dialing code AMA record is created by the SSP 15 to bill the charges associated with the use of the #XXX service. This record, an AIN Bellcore Automatic Message Accounting Format (BAF) record, is used to bill the subscriber on a minutes of use or per call charge basis for the abbreviated dialed service. The charges associated with the use of the #XXX service are billed to the subscriber in a customer record information system (CRIS). The abbreviated dialing code AMA record is sent (as will be discussed with respect to step 8) from the SSP 15 to a regional accounting office having a billing system, e.g., Ameritech Customer Information System (ACIS). The billing system is a computer data processing system that, among other things, inputs appropriate charges on the subscriber's account. The abbreviated dialing code AMA record may be transmitted to the regional accounting office by various telecommunications systems, for example, FTP, WAN, TCP/IP, fiber optic, etc.

At step 4, the SSP 15 queries the toll free database 30 where an appropriate IXC CIC code is attached to the ten digit toll free number and the number is sent back to the SSP 15 at step 5. At this point, an access charge AMA record is created by the SSP 15 to bill 800 originating access charges to the IXC that transports the call to the 800 number of the subscriber. The 800 originating access charges are processed by the billing system 50 and are billed to the IXC using a carrier access billing system (CABS). The access charge AMA record is sent (as will be discussed with respect to step 8) from the SSP 15 to a regional accounting office having a billing system, e.g., ACIS. As previously mentioned, the billing system is a computer data processing system that inputs appropriate charges on the subscriber's account. The access charge AMA record may be transmitted to the regional accounting office by various telecommunications systems, for example, FTP, WAN, TCP/IP, fiber optic, etc.

Additionally, at step 6, the SSP 15 hands the call off to the appropriate IXC 35 as identified by the toll free database 30.

At step 7, the IXC 35 routes the call to the customer call center 40. Thereafter, a representative at the customer call center will ask the caller what product, company or advertiser they are interested in. Based upon the caller's response, the representative directs the call to be routed to the respective company or advertiser via the company/advertiser's toll free number.

At step 8, the abbreviated dialing code AMA record and the access charge AMA record are sent from the SSP 15 to the billing system 50. Additionally, the SSP 15 sends the alternate billing number and AMA slpID to the billing system 50. The alternate billing number and AMA slpID are transmitted to the billing system, each with their own appended module. As previously mentioned, these parameters are initially passed from the SCP 25 to the SSP 15. Based upon the alternate billing number and appended module, a record is made in the billing system 50 indicating that a #XXX call was placed so that a charge may be incurred to the subscriber's account.

Figure 3:
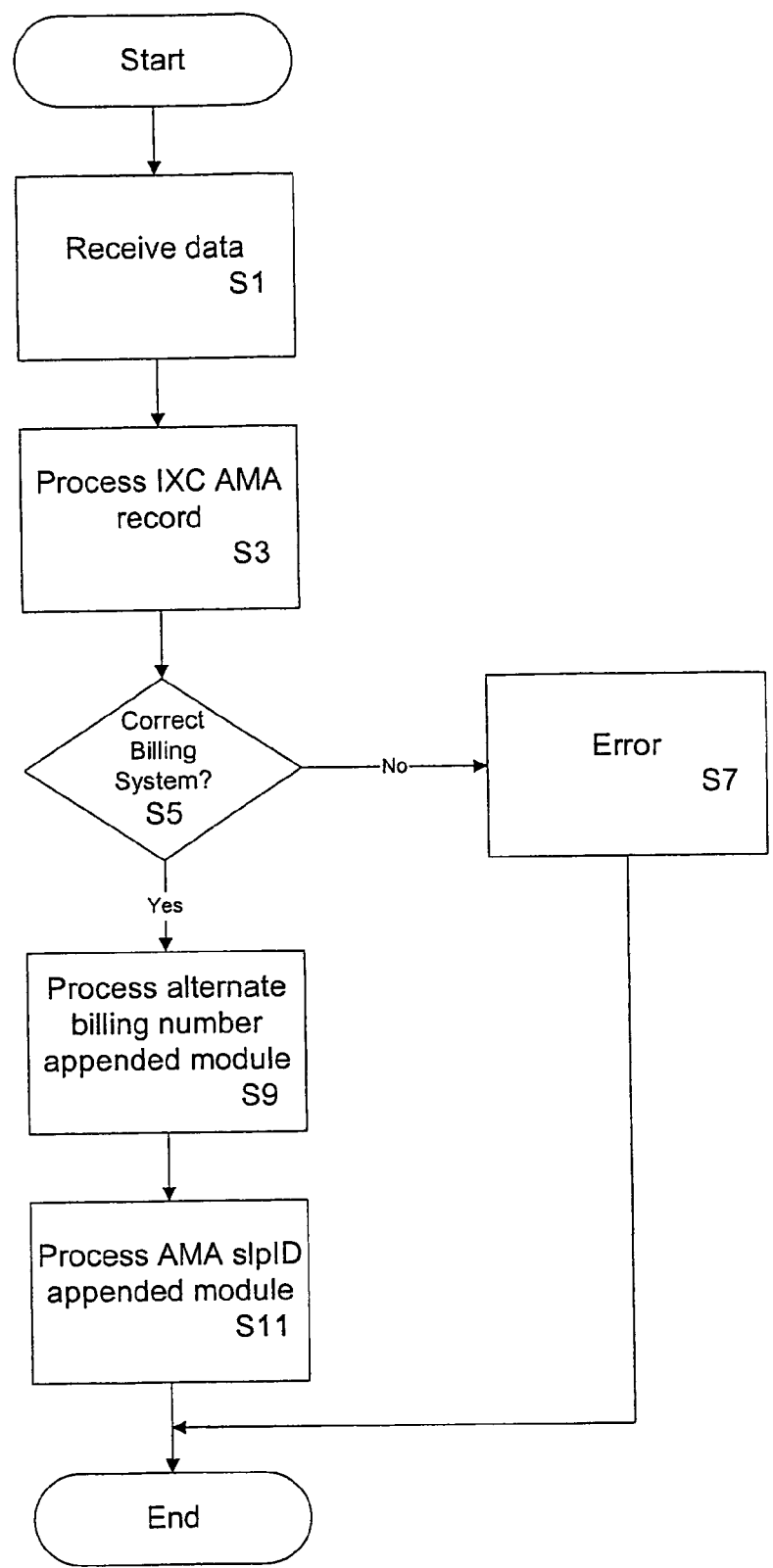
FIG. 3 is a flowchart diagram of exemplary billing processing, according to an aspect of the present invention.

An example of the billing system processing will now be discussed with reference to the exemplary flowchart diagram of FIG. 3. At step s1, the billing system 50 receives the abbreviated dialing code AMA record and the access charge AMA record, alternate billing number, and AMA slpID from the SSP 15. The alternate billing number and AMA slpID each have an appended module. The programming in the billing system recognizes each module as an instruction to perform a specific function, as will be discussed below.

At step s3, the billing system 50 processes the charges associated with the access charge AMA record in a known manner. As previously mentioned, the access charge AMA record is used to bill 800 originating access charges in CABS to the IXC that transports the call to the 800 number of the subscriber.

At step s5, it is determined whether the data sent from the SSP 15 has been sent to the correct billing system within a state. That is, in some of the larger states, such as Texas, the LATAs are widely dispersed necessitating distinct billing systems. Thus, in order to ensure proper processing, downstream data sent from the SSP to a billing system must coincide. The alternate billing number and AMA slpID sent from the SSP 15 are compared to unique alternate billing numbers and AMA slpIDs stored at the billing system. If alternate billing number and AMA slpID sent from the SSP 15 do not match the data at the billing system an error results at step s7 and processing terminates. Otherwise, processing continues at step s9.

At step s9, the billing system 50 reads the module appended to the alternate billing number as an instruction to perform a specified function. That is, the module instructs the billing system to use the alternate billing number to bill the subscriber. Specifically, the billing system records an entry to the subscriber's account indicating that a #XXX call was placed, so that the subscriber can be billed for each of the processed #XXX calls. The #XXX charges are billed in CRIS. As a result, the telecommunications carrier may recoup charges for the #XXX service from the subscriber.

At step s11, the billing system 50 interprets the module appended to the AMA slpID as an instruction to perform a specified function. That is, the module instructs the billing system 50 that the abbreviated dialing code AMA record may be discarded so that the calling party (i.e., end user) is not billed for the originating #XXX telephone call. As a result, a cross check is performed using the AMA slpID and a free billing table (FBT). The FBT contains the #XXX number and associated AMA slpID (e.g., 333 and 033300101, respectively), both of which were previously provisioned in the FBT by the telecommunications carrier. A cross check is performed in the event that the #XXX is used for another service, in which case the abbreviated dialing code AMA record should not be discarded. If a match for the AMA slpID is located in the FBT, the access charge AMA record is discarded.

Figure 4:
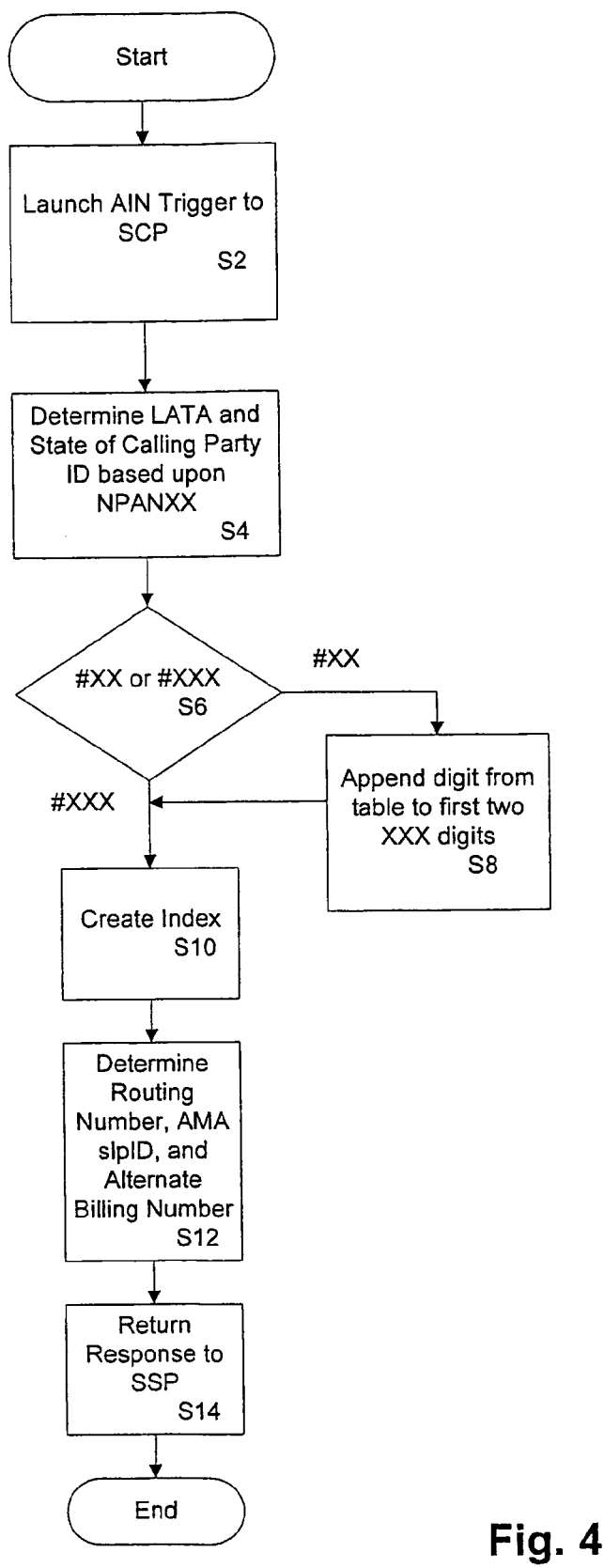
FIG. 4 is a flowchart diagram of exemplary SCP service logic, according to an aspect of the present invention.

FIG. 4 shows an exemplary flowchart diagram of the SCP service logic, according to an aspect of the present invention. At step s2 a query is received at the SCP 25 including the NPANXX of the calling party. The SSP 15 creates an Info_Analyzed message to send to the SCP 25 when a VSC or PODP trigger is encountered. If an OHD trigger is encountered, the SSP 15 creates an Info_Collected message to send to the SCP 25. In either situation, the parameters expected by the service logic include access code, vertical service code, redirection information, and calling party ID. The access code and vertical service code parameters correspond to the #XXX number assignment, or any other special dialing sequence service provided by the telecommunications provider, e.g., *98. The redirection information parameter is populated when a calling party with active call forwarding places a #XXX call from the forward to number. In this scenario, the redirection information is populated with the calling party's original telephone number. The calling party ID parameter is the telephone number of the calling party.

In response to the query, at step s4 an NPANXX table is used to derive the LATA and state of the calling party based upon what NPANXX the call originated from. An exemplary layout of the NPANXX table is shown below as Table 1. The table includes an NPANXX column, a LATA column and a STATE column. The NPANXX column stores either an NPA or an NPANXX. The LATA column stores a 3 digit LATA, and the STATE column stores the state name or District of Columbia. Such a table should include all NPANXXs in the service area, so that all lookups will find a match. The index into the NPANXX table is the NPA or NPANXX of the calling party. As a result of a lookup in the table, the state and LATA corresponding to the NPANXX of the calling party telephone number are retrieved.

TABLE 1

| NPANXX | LATA | STATE |
|--------|------|-------|
| 312 | 358 | ILLINOIS |
| 328225 | 229 | WISCONSIN |
| 317227 | 432 | INDIANA |
| 313342 | 589 | MICHIGAN |
| 330343 | 832 | OHIO |

At step s6 a determination is made as to whether an #XX or #XXX code was received at the SCP 25. If an #XXX code was received, processing continues at step s10. At step s6, if an #XX code was received, a look-up is performed in a table at step s8 where a digit is retrieved and appended to the end of the XX string. A #XX code may be received when the service is accessed via a 1AESS office.

If an #XX code is received, a Global Information Table is accessed to ascertain an additional digit. Although each subscriber to the #XXX service is assigned the complete three digits, because the call originated from a 1AESS office, only the #XX is received at the SCP 25. The index, which is used for searching the Global information Table when only 2 digits have been received, is 1 plus the first two XX digits of the three assigned XXX digits plus the LATA of the calling party. For example, if the #XXX code is 123 in LATA 425 and the digits received at the SCP 25 are #12, the index for this code is 1+12+425 or index=112425. Each entry in the index field of this table requires additional entries in a Code Last Digit field. The Code Last Digit field is populated when an index for a 1AESS office is entered for an XX code. This field will contain the third digit of a #XX code. For example, if a caller dials #123 from a 1AESS office in LATA 425, the SCP 25 receives #12 and LATA 425. In the Global Information Table, index 112425 is populated and the Code Last Digit field is populated with a 3.

When all three digits are present, at step s10 an index for a telephone number and billing information lookup is created. An exemplary index includes the XXX digits prefixed to the state name, with the LATA appended thereto. For instance, an access code of 333 with a calling party in Illinois and LATA 358 would create an index equal to 333ILLINOIS358.

Based on the index, at step s12 the called party ID is found in a table. That is, the called party ID parameter is set to the toll free telephone number assigned by the subscriber to the received dialed XXX code, state and LATA. Also, at step s12 the AMA slpID is set based on the index. That is, the AMA slpID parameter is set to the AMA slpID number associated with the dialed XXX code, and the state and LATA associated with the calling party. Additionally, at step s12 the alternate billing number is determined based on the index. That is, the alternate billing number parameter is set to the alternate billing number associated with the dialed XXX code, and the state and the LATA of the calling party.

FIG. 5 is an exemplary layout of an #XXX table. The table includes a #XXX column, LATA column, State Name column, Routing Number column, AMA slpID column, and an Alternate Billing Number Column. The Routing Number column contains the toll free number of the subscriber of the #XXX service. The AMA slpID column contains the AMA slpID, which is preferably composed of a leading zero, followed by the digits of the #XXX code, and followed by five additional digits (usually zeroes or ones). One AMA slpID is associated with each #XXX code. A separate alternate billing number is provided for each #XXX within a particular LATA.

At step s14 the SCP 25 returns a response to the SSP 15. The response is an Analyze_Route message if all of the service criteria are met to validate call completion on the vertical service code or access code dialed. The significant parameters included in the Analyze_Route response are the calling party ID, called party ID, AMA slpID, and alternate billing number. A Send_to_Resource response is returned when the vertical service code or access code is invalid. The Send_to_Resource response causes the switch 15 to play a message to the calling party, such as "We're sorry, we cannot complete your call as dialed. Please hang up, check the number and try again."

Figure 6:
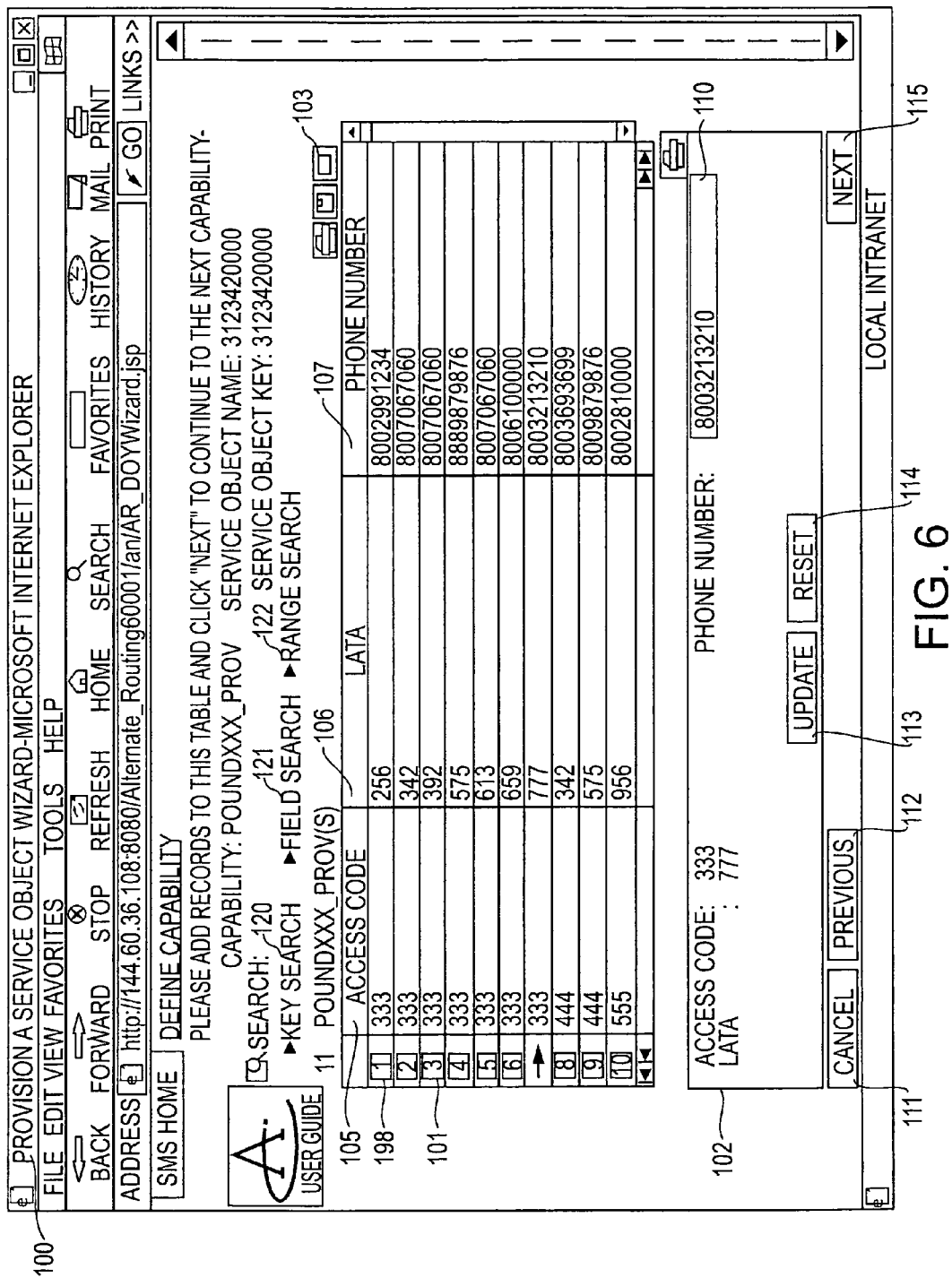
FIG. 6 illustrates an exemplary Web page of a service management system (SMS) that is used to access a subscriber data directory, according to an aspect of the present invention.

FIG. 6 is an exemplary Web page 100 of a service management system (SMS) that is used to by a subscriber to access a subscriber data directory. The SMS may be accessed using, for example, Internet Explorer, version 4.0 or higher, or Netscape, version 4.7 or higher. The SMS is capable of accepting information from a Web interface which will be used to provision the #XXX information, LATA, state name, toll free number of the subscriber, and the alternate billing number in the SCP 25. The data entered in the SMS is transmitted and stored on a partitioned database in the SCP 25, where it is the source of the data located in the #XXX table of FIG. 5. The subscribers will be permitted access to the SMS to initially set up their 800 number information associated with each #XXX number; however, the subscriber will not see nor have access to the alternate billing number. Prior to the subscriber setting up the toll free information, the alternate billing number, AMA slpID, LATA, and state name are entered into the SMS by the telecommunications carrier. One 800 number is required to be entered by the subscriber for each LATA in which an #XXX service is offered.

To ensure that usage is directed to the correct billing system, at least one alternate billing number is assigned and provisioned in the AIN platform for each LATA in which the #XXX service is deployed. If a LATA crosses state boundaries, two alternate billing numbers will be assigned and provisioned per LATA. If a particular #XXX service is offered to more than one subscriber, a different set of alternate billing numbers and toll free numbers will be required for each subscriber.

Subscribers will be able to make changes to the SMS, which will be viewable by the subscriber on a real time or near real time basis. The SMS provides the ability to view metrics pertaining to the service via tables or graphs, without viewing the services provided to other subscribers. Other features of the SMS include troubleshooting, storage of performance statistics, and performance metrics on a per user basis to analyze service performance.

Login to the SMS requires entering a user name consisting of a 10 digit telephone number from the subscriber's POTS line and the subscriber password. After validation as a user, the subscriber is presented with a message screen which displays any new messages of information that may be important to the subscriber. A define capability screen 100 as shown in FIG. 6 allows a subscriber to add, delete, or change 800 number information in the subscriber data directory for each access code and LATA. The functionality of the define capability screen 100 also permits the subscriber to view records, search by access code, LATA, state, or 1-800 number.

Define capability screen 100 contains table 101 and text box 102. A new record may be added by the subscriber by clicking on new record icon 103. Table 101 includes an access code column 105 that contains all of the #XXX codes for a particular subscriber. A LATA column 106 contains all of the LATAs associated with the access codes in column 105. A phone number column 107 contains the toll free number associated with the access code and LATA of columns 105 and 106. A state column, not shown, contains the state name associated with the information in columns 105, 106, and 107. A state identifier such as an abbreviation may be provided in lieu of the entire state name.

Mini icons in column 108 allow selection of a particular access code, with associated LATA, state, and phone number for updating or deleting information. By selecting a mini icon in column 108, the particular access code, with associated LATA, state, and 800 number appears in text box 102. The 800 number may be changed or new 800 numbers may be added by entering 800 number information in phone number text box 110. Bulk changes to the subscriber data directory may be accomplished via file transport protocol (FTP). Various other functions are included on the define capability screen including a cancel button 111 that terminates the current set of updates and discards all of the changes made during a particular session. A previous button 112 is provided that returns the subscriber to a previous screen, i.e. a service object screen (not shown). The service object screen displays to a subscriber the #XXX services to which they subscribe. An update button 113 is provided to enter the information in phone number text box 110 into table 101. A reset button 114 is provided to clear the contents of the phone number text box 110 and a next button 115 takes the user to a work orders screen (not shown). The work orders screen displays all of the changes that have been input into define capability screen 100.

Several search tools may be accessed at the define capability screen, i.e., key search tool 120, field search tool 121, and range search tool 122. Key search tool 120 allows a search for an 800 telephone number. Clicking on key search tool 120 displays a text field for the number to be entered. After entering all 10 digits of the 800 number and clicking the search button, the information corresponding to the 800 number will be displayed in a data table. The field search tool 121 allows a search of the access code data by LATA, state, phone number, or access code. Also, field search may be used to find all access codes beginning with the same digits or characters, e.g., searching for all LATAs and 800 numbers associated with 333 access codes. The procedure for using the field search tool 121 includes clicking on the field search button, selecting the type of search (e.g., access code or LATA), selecting a sorting criteria (i.e., access code, LATA, state, or phone number), and selecting an operator (e.g., equal, less than, etc.). The range search tool 122 allows a search for all access codes in a given range or a search for LATAs within a numeric range (e.g., from 333 to 555). The procedure for using the range search includes clicking on the range search tool 122, and entering either the desired range in the access code fields or LATA fields and clicking on the search button.

A logout button (not shown) is provided on certain screens of the SMS. Additionally, an automatic logout is performed after a predetermined period of inactivity.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor, including switches, etc. Dedicated hardware implementations including, but not limited to, application specific integrated circuits, programmable logic arrays and other hardware devices can likewise be constructed to implement the methods described herein. It should also be noted that the software implementations of the present invention can be stored on a tangible storage medium such as a magnetic or optical disk, read-only memory or random access memory and be produced as an article of manufacture.

Although the present specification describes components and functions implemented in the embodiments with reference to particular standards and protocols, the invention is not limited to such standards and protocols. Each of the standards for AIN and public telephone networks (ISDN, ATM, xDSL) similarly represent examples of the state of the art. Such standards are periodically superseded by faster or more efficient equivalents having essentially the same functions. Accordingly, replacement standards and protocols having the same functions are considered equivalents.

What is claimed is:

1. A method in an AIN telecommunications environment of identifying a subscriber to bill for an abbreviated dialing code call placed by a calling party, the method comprising:
    receiving an incoming call in response to the calling party having dialed an abbreviated dialing code;
    translating the abbreviated dialing code to a toll free number associated with the abbreviated dialing code;
    sending a query to a service control point to determine first and second parameters associated with the abbreviated dialing code; and
    using the first parameter to bill the subscriber of the abbreviated dialing code for the call rather than the calling party,
    wherein the toll free number is associated with the subscriber to be billed for the call placed to the abbreviated dialing code.

2. The method according to claim 1, further comprising:
    using the second parameter to discard an abbreviated dialing code automatic message accounting record associated with the second parameter.

3. The method according to claim 1, further comprising sending the first parameter to a billing system.

4. The method according to claim 1, further comprising sending the second parameter to a billing system.

5. The method according to claim 1, the first parameter further being associated with a subscriber's abbreviated dialing code for a state and LATA in which the call originated.

6. The method according to claim 1, wherein the first parameter comprises an alternate billing number.

7. The method according to claim 1, wherein the second parameter comprises an automatic messaging accounting number.

8. The method according to claim 1, wherein the abbreviated dialing code comprises a #XXX sequence.

9. The method according to claim 1, wherein the abbreviated dialing code comprises a #XX sequence.

10. A telecommunications system for processing calls placed by a calling party to an abbreviated dialing code service in an AIN telecommunications environment, comprising:
    a service control point that derives first and second parameters associated with a subscriber's abbreviated dialing code; and
    a billing system that inputs charges associated with abbreviated dialing code calls on a subscriber's account and discards billing records associated with a calling party's use of the abbreviated dialing code service.

11. The telecommunications system according to claim 10, wherein the service control point stores information provisioned by a subscriber of the abbreviated dialing code service.

12. The telecommunications system according to claim 10, wherein the service control point derives a routing number of a subscriber that has been designated for a particular LATA.

13. The telecommunications system according to claim 10, wherein the first parameter comprises an alternate billing number.

14. The telecommunications system according to claim 10, wherein the second parameter comprises an automatic messaging accounting number.

15. The telecommunications system according to claim 10, further comprising a service switching point provisioned with a public office dialing plan feature code trigger.

16. The telecommunications system according to claim 10, further comprising a service switching point that creates an abbreviated dialing code AMA record in response to receiving the first and second parameters from the service control point.

17. The telecommunications system according to claim 10, wherein the service control point translates the abbreviated dialing code to a toll free number.

18. The telecommunications system according to claim 10, wherein the abbreviated dialing code consists of a #XXX or #XX sequence.

19. A computer readable medium storing a computer program that identifies a subscriber to bill for an abbreviated dialing code call placed by a calling party, the program comprising:
    a receiving code segment that receives an incoming call in response to the calling party having dialed an abbreviated dialing code;
    a translating code segment that translates the abbreviated dialing code to a toll free number associated with the abbreviated dialing code;
    a determining code segment that determines first and second parameters associated with the abbreviated dialing code; and
    a billing code segment that uses the first parameter to bill the subscriber for the call rather than the calling party,
    wherein the toll free number is associated with the subscriber to be billed for the call placed to the abbreviated dialing code.

20. A computer readable medium for storing a program for processing billing of an abbreviated dialing code call placed by a calling party, the program comprising:
    a recording code segment that records information associated with a subscriber's abbreviated dialing code, the information comprising at least a toll free number of a subscriber;
    a determining code segment that determines first and second parameters associated with the subscriber's abbreviated dialing code; and
    a billing code segment that bills the subscriber for the call rather than the calling party, using the first parameter.

21. A method in an AIN telecommunications environment of billing a subscriber for an abbreviated dialing code call placed by a calling party, the method comprising:
    receiving an incoming call in response to the calling party having dialed an abbreviated dialing code;
    translating the abbreviated dialing code to a toll free number associated with the abbreviated dialing code;
    determining an alternate billing number based upon a location of the calling party and the abbreviated dialing code, the determination occurring at a service control point; and
    using the alternate billing number so that the subscriber of the abbreviated dialing code is billed for the call rather than the calling party,
    wherein the toll free number is associated with the subscriber to be billed for the call placed to the abbreviated dialing code.

* * * * *